United States Patent
Riley

(10) Patent No.: US 9,214,034 B2
(45) Date of Patent: Dec. 15, 2015

(54) SYSTEM, DEVICE AND METHOD FOR DISPLAYING A HARMONIZED COMBINED IMAGE

(71) Applicant: Application Solutions (Electronics and Vision) Ltd., Lewes (GB)

(72) Inventor: Tom Riley, Haywards Heath (GB)

(73) Assignee: Application Solutions (Electronics and Vision) Ltd., Lewes (GB)

( * ) Notice: Subject to any disclaimer, the term of this patent is extended or adjusted under 35 U.S.C. 154(b) by 0 days.

(21) Appl. No.: 14/324,645

(22) Filed: Jul. 7, 2014

(65) Prior Publication Data

US 2015/0071534 A1    Mar. 12, 2015

(30) Foreign Application Priority Data

Sep. 6, 2013 (EP) .................................. 13183281

(51) Int. Cl.

| | |
|---|---|
| G06T 11/60 | (2006.01) |
| G06T 3/40 | (2006.01) |
| H04N 5/232 | (2006.01) |
| B60R 1/00 | (2006.01) |
| G06T 7/40 | (2006.01) |
| H04N 7/18 | (2006.01) |

(52) U.S. Cl.
CPC ................ *G06T 11/60* (2013.01); *B60R 1/002* (2013.01); *G06T 3/4038* (2013.01); *G06T 7/408* (2013.01); *H04N 5/23238* (2013.01); *H04N 7/181* (2013.01)

(58) Field of Classification Search
USPC ........................................... 382/167; 348/148
See application file for complete search history.

(56) References Cited

U.S. PATENT DOCUMENTS

| | | | |
|---|---|---|---|
| 6,813,391 B1 | 11/2004 | Uyttendaele et al. | |
| 2006/0017807 A1 | 1/2006 | Lee et al. | |
| 2012/0026333 A1* | 2/2012 | Okuyama | ..................... 348/148 |

FOREIGN PATENT DOCUMENTS

| | | |
|---|---|---|
| EP | 2 012 271 | 1/2009 |
| EP | 2 410 740 | 1/2012 |
| JP | 2007-323587 A | 12/2007 |
| WO | WO 2011/082716 | 7/2011 |

OTHER PUBLICATIONS

European Search Report and Examination Report for European Application No. EP 13183281.8, dated Dec. 16, 2013, 8 pages, Munich, Germany.
Carey Bunks; "Grokking the GIMP—Advanced Techniques for Working with Digital Images"; Feb. 1, 2000; XP002568815, section 7.5.2, pp. 256 to 263.

* cited by examiner

*Primary Examiner* — Duy M Dang
(74) *Attorney, Agent, or Firm* — W. F. Fasse

(57) ABSTRACT

A method for harmonizing a combined image involves receiving a respective image or image frame from each of two or more cameras, the images from two of the cameras representing the same region in an overlap region, measuring pixel statistics of at least some of the pixels in the overlap region for the image of each of the two cameras, determining a difference in the pixel statistics $\Delta_{pixel}$ of the image from each of the two cameras in the overlap region, calculating a correction factor $K_{pixel}$, wherein the correction factor $K_{pixel}$ may be predicted to produce a reduction in $\Delta_{pixel}$ of less than $\Delta_{pixel}/2$ when applied to the image of one of the two cameras, applying the correction factor $K_{pixel}$ in a hardware device acquiring the image, and receiving a further image or image frame from each of the two cameras.

20 Claims, 5 Drawing Sheets

SYSTEM, DEVICE AND METHOD FOR DISPLAYING A HARMONIZED COMBINED IMAGE

PRIORITY CLAIM

This application is based on and claims the priority under 35 USC 119 of European Patent Application 13183281, filed on Sep. 6, 2013, the entire disclosure of which is incorporated herein by reference.

FIELD OF THE INVENTION

The present invention relates to a system, a device and a method for displaying a harmonized combined image, in particular for displaying a harmonized combined image from two or more cameras positioned on a motor vehicle.

BACKGROUND INFORMATION

A motor vehicle may include one or more cameras for capturing images of the environment around the vehicle. The images may be used for detecting lanes on the road or traffic signs or may provide the driver with a view of the immediate vicinity of the vehicle. The view of the immediate vicinity of the vehicle may be used to assist the driver when parking the vehicle or may be used to improve safety as the driver is able to view areas which are screened from him in a normal driving position. Hazards or possible hazards may also be detected from the captured image or images and then provide the driver with a warning or the information may be used in connection with driver assistance systems to actively take control of the vehicle and avoid the hazard.

Typically several cameras, for example four, are provided on the vehicle. The images from each of the cameras may be combined to provide a 360° image in the form of a top view, also denoted as a bird's eye view, or a panoramic view. Typically, the images from adjacent cameras, for example a front camera and a side camera, overlap with one another in order to provide an uninterrupted 360° view. If the brightness and color of the images from adjacent cameras differ, the resulting combined image may be difficult to discern.

The published patent application JP 2007-323587 A discloses an image composition device in which a mean value of pixels in the image overlapping areas of adjacent cameras is calculated to find gain unifying hues of the adjacent camera images. A correction gain calculation unit adjusts a hue to those of surrounding camera images to reduce the difference of correction gain values between adjacent camera images in order to combine the images into an easily visible composite image with a uniform hue.

However, since cameras on vehicles are typically video cameras capturing a number of images per second, providing correction gain values for each of the images requires certain processing resources which may not be available in the vehicle.

SUMMARY OF THE INVENTION

In view of the above, it is an object of embodiments of the present invention to provide methods of harmonizing a combined image, which are suitable for harmonizing images from adjacent cameras positioned on a vehicle and which can be simply carried out with fewer processor resources than according to the prior art. Further objects of the invention are to provide a device and a system for harmonizing a combined image from images received from adjacent cameras positioned on a vehicle. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in an embodiment of a method of harmonizing a combined image that includes receiving an image from each of two or more cameras, the images from two of the camera representing the same region in an overlap region, measuring pixel statistics of a predetermined number of predetermined pixels in the overlap region for the image from each of the two cameras, determining a difference in the pixel statistics $\Delta_{pixel}$ of the image from each of the two cameras in the overlap region, and calculating a correction factor $K_{pixel}$, the correction factor $K_{pixel}$ being predicted to produce a reduction in $\Delta_{pixel}$ of less than $\Delta_{pixel}/2$ when applied to the image of one of the two cameras. The correction factor $K_{pixel}$ is applied in a hardware device acquiring the image. A further image is then received from the two cameras.

The two cameras each capture an image, a portion of which represents the same real world area. This same real world area is, typically, represented in an overlapping region of the individual images from two adjacent cameras. The images of adjacent cameras may overlap in order to provide a 360° uninterrupted view of the environment in the immediate vicinity of the vehicle. For example, there may be an overlap region between the right hand portion of an image captured by a front camera and the left hand portion of an image captured by a right side camera arranged on the vehicle. The front camera may also provide an image having a second overlap region since the front camera is also adjacent to the left side camera. Similarly, the images from the left side camera and the right side camera each have an overlapping region with the image from a rear camera.

It is assumed that the two images representing the same real world area should have the same pixel statistics. Therefore, by determining the pixel statistics of the pixels representing the same real world area in the overlap region of the two images, then a difference in the pixel statistics in this overlap region between the two images can be determined. This difference can be reduced in order to harmonize the combined image produced from the two individual images. Methods for combining individual images to form a combined or composite image are disclosed in WO 2011/082716 A1, for example.

According to an embodiment of the invention, the correction factor is applied in a hardware device acquiring the image. This avoids the need for applying the correction factor to the image or images and, in particular, to each of the pixels making up the image. Therefore, by applying the correction factor in the hardware device acquiring the image, the next image received from the camera has the correction factor applied to all of the pixels of the image acquired by the hardware device. This method requires fewer processing resources as it avoids the need to apply the correction factor to all or even to a substantial proportion of the pixels of the image. Additionally, the method avoids applying the correction to each pixel of the images before displaying the image or combined image. Consequently, a possible delay in displaying the image whilst the correction factor is applied in the image processing routine is avoided.

A correction factor which is predicted to produce a reduction in the difference in the pixel statistics of the image from each of the two cameras in the overlap region of less than half the difference is calculated. This enables the difference in the pixel statistics to be gradually reduced providing a combined image which is more discernible to the human eye.

The correction factor may take into account the parameters of the hardware device acquiring the image which affect the pixel statistics. Therefore, the method provides a correction factor which, when applied by the hardware device acquiring the image, is predicted to produce a reduction in the difference in the pixel statistics of less than half of the difference. Thus, the exact effect of the correction factor on the difference in the pixel statistics measured in the overlap region from the next image received from each of the two cameras is not calculated. This again may assist in reducing the processor resources required.

The method may be reiterated, even if the difference in the pixel statistics and, therefore, the correction factor is very small and even zero. This allows for the situation in which the environment captured by the two cameras suddenly changes after a stable period. For example, a vehicle could emerge from a shady street into bright sunlight. After the image has been harmonized over a period of time in which a correction factor has been calculated and applied to a number of sequentially received images whilst driving along the shady street, the correction factor will tend to be small or even zero. However, as soon as the vehicle emerges into the sun light, the difference in pixel statistics will be much greater, and the correction factor applied will be greater than that applied to the last frame captured within the shady street.

The pixels of the image within the overlapping area may be predetermined and known. In some embodiments, the pixel statistics of all of the pixels in the overlap region may be measured. However, in some embodiments, only a proportion of the pixels may be selected. By using only a proportion of the pixels in the overlap region, the processing resources required to carry out the method may be reduced.

In one embodiment, the mean of the luminance in the overlap region of the image from each of the two cameras is determined. This method is simple to perform.

In a further embodiment, the variance of the luminance of the pixels in the overlap image region of the image from each of the two cameras as well as the mean of the luminance is calculated.

In a further embodiment, a predetermined maximum gain value of the hardware device is taken into account in calculating the correction factor. This embodiment may be used if the difference in the pixel statistics is very large, for example because one camera is facing into the sun and captures a very bright image, whereas the adjacent camera captures an image from deep shade. In this embodiment, the method further includes determining if the calculated correction factor is predicted to result in a gain value for the hardware device which is higher than the predetermined maximum gain value. If this is the case, then the correction factor is adjusted so that the predicted gain value for the hardware device is less than or equal to the predetermined maximum gain value. The adjusted correction factor is output and applied in the hardware device acquiring the image.

As mentioned above, the correction factor is output and applied in hardware devices acquiring the image. This enables the correction factor to be applied to all of the pixels of the next image acquired by at least one of the cameras without requiring extra steps, such as extra image processing steps to apply the correction factor to each of the pixels of the image before displaying the image.

The hardware device may be the camera itself, in which case the correction factor may be applied to the acquisition parameters of the camera. This embodiment may be used for analog and digital cameras. In some embodiments, the hardware device is a video decoding device. The video decoding device is coupled to the camera and may be used to convert an analog signal from an analog camera into a digital signal. In the case that the hardware device is the video decoding device, the correction factor may be applied to the gain and offset of the video decoding device.

The image from each of the at least two cameras may be displayed as a combined image. The displaying of the combined image may take place independently of the methods described above. For example, the images may be received from two of the cameras, whereby the images represent a common real world region in an overlap region. These images may be combined and displayed and also subjected to one of the methods described above to calculate a correction factor which is then applied in the hardware device before a further image is captured by the two cameras. This has the advantage that the displaying of the combined image is not slowed down by processing of the acquired images before display of the combined image. This enables the displayed image to be nearer to real-time.

In another embodiment, a computer program product is also provided that comprises program code tangibly embodied thereon e.g. stored or recorded or encoded in a tangible physical medium such as a magnetic tape, a magnetic disc, an optical disc, an electronic memory, or any other known data storage or recordal device. The program code, when executed on a processor, causes the processor and/or connected peripheral devices to perform the method according to one of the embodiments described herein. The computer program product may comprise a data carrier, such as an optical drive, hard disk, flash memory etc. This embodiment may be useful if the computer program is to upgrade or enhance an existing system.

The computer program product may alternatively be stored in memory in a device or a system for image capturing and/or image processing. This embodiment may be used if a device and system is provided for installation in a vehicle.

A further embodiment provides a device for producing a harmonized image from two or more cameras, which includes a module configured to receive an image from two or more cameras and configured to perform the method of one of the embodiments described herein. This device and/or this module may be useful for fitting or retrofitting the device or the module to a vehicle including preinstalled cameras.

In another embodiment, a system is provided for displaying a harmonized image which comprises this device, two or more cameras and a display. This system may be provided in the form of a kit for installation into a vehicle.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
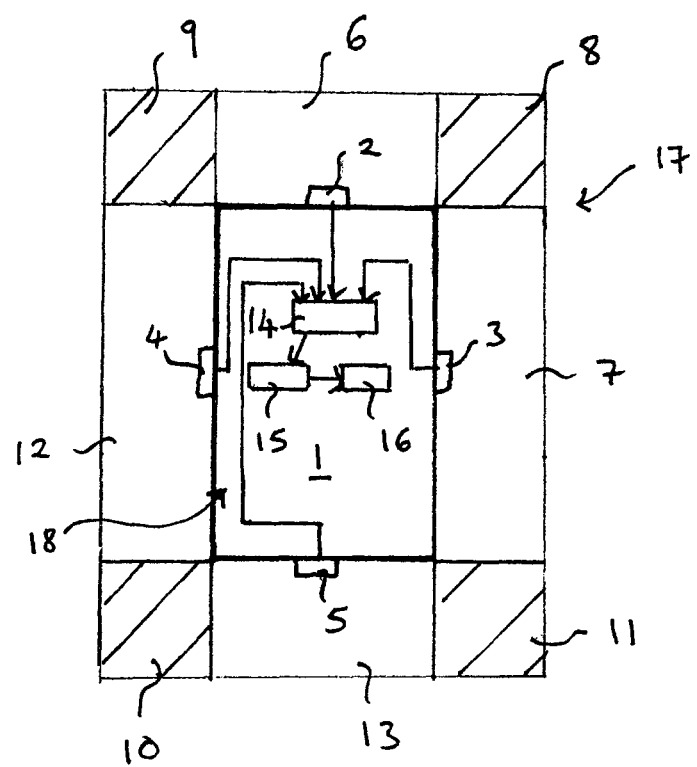
FIG. 1 is a schematic diagram of a vehicle and a combined top view image of surroundings of the vehicle.

FIG. 1 is a schematic diagram of a top view of a motor vehicle 1 including four cameras 2, 3, 4 and 5 arranged to capture a 360° view of the surroundings in the vicinity of the vehicle. The camera 2 is positioned at the front of the vehicle, the camera 3 is positioned on the right side of the vehicle, the camera 4 is positioned on the left side of the vehicle, and the camera 5 is positioned at the rear of the vehicle. Each camera comprises an electronic image sensor. In other embodiments, instead of four separate cameras, an inventive apparatus may involve plural image sensors or image sensor areas of a single camera device for respectively capturing the plural image areas that are to be combined and harmonized. References to plural cameras should be understood to also cover arrangements with plural image sensors or plural sensitive areas incorporated within a single camera device, as well as arrangements with plural separate cameras.

Each of the cameras 2, 3, 4, 5 captures a respective individual image which is schematically represented as a generally rectangular image area in FIG. 1. In reality, the captured image area may have a different shape such as a triangle in a planar representation or a cone in three dimensions. The image area is indicated with the reference number 6 for the camera 2 and with the reference number 7 for the camera 3. There is an overlap region 8 between the image areas 6 and 7 of the adjacent cameras 2, 3. There is a similar overlap region 9 between the front camera 2 and the left camera 4, overlap region 10 between the left camera 4 and the rear camera 5, and overlap region 11 between the rear camera 5 and the right camera 3.

The four images 6, 7, 12 and 13 produced by the front camera 2, right camera 3, left camera 4 and rear camera 5, respectively, each comprise successive image frames acquired or captured by the respective camera, and a given frame of the four images are combined to produce a combined or composite top view 17 of the surrounding environment in the immediate vicinity around the vehicle 1.

The cameras 2, 3, 4, 5 are each coupled with a video decoder 14, which in turn is connected to an image processing unit 15 for combining and harmonizing the four images 6, 7, 12, 13, which further in turn is connected to a display 16 for displaying the combined image. There may be individual video decoders provided respectively for the individual cameras, or a single video decoder provided in common for all of the cameras. The cameras 2, 3, 4, 5, video decoder 14, image processing unit 15 and display 16 provide a system 18 involving a hardware device as well as associated program software, for harmonizing a combined image.

Methods are provided for harmonizing differences in luminance and color of the respective four images 6, 7, 12 and 13 captured by the four cameras 2, 3, 4, 5 and, in particular, for harmonizing the respective images between two adjacent cameras. These methods may be performed in the image processing unit 15 of the vehicle 1.

Figure 2:
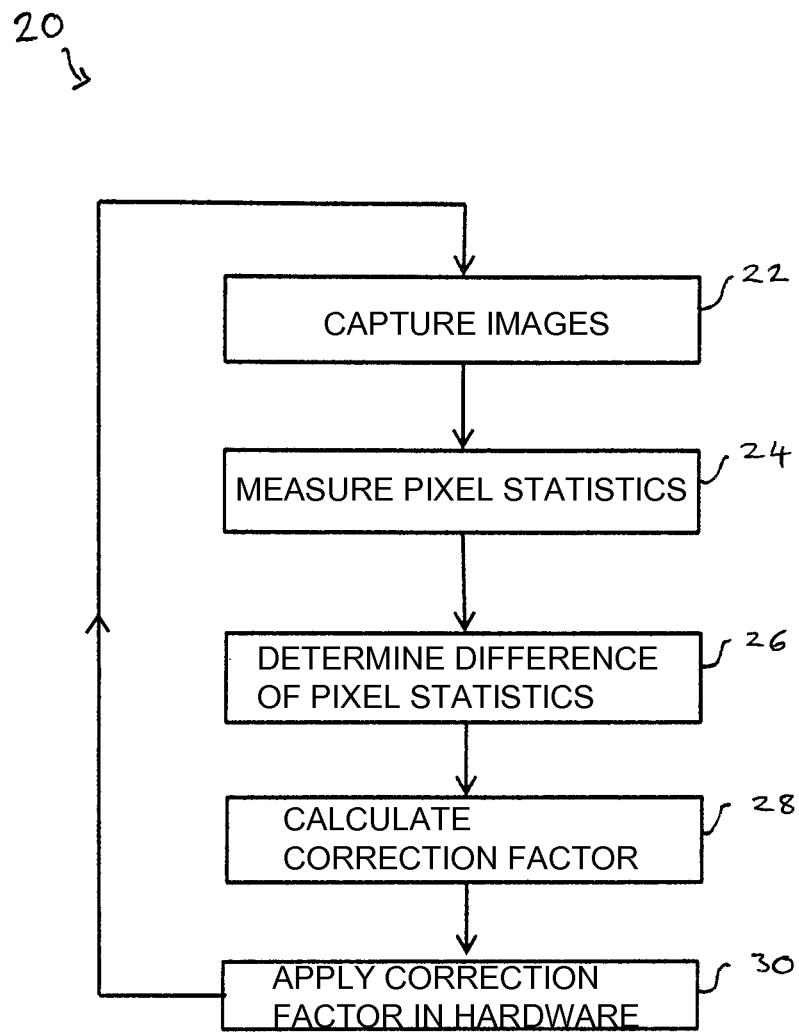
FIG. 2 is a flowchart illustrating a method for harmonizing a combined image according to a first embodiment.

A flow chart 20 representing a method for harmonizing a combined image according to a first embodiment is illustrated in FIG. 2. For the purposes of describing the method, two cameras and a single overlap region will be considered first. However, the method may be carried out for all four cameras and all four overlap regions.

In step 22, a respective image 6, 7 is received from each of two or more cameras, in particular, from the front camera 2 and the adjacent right camera 3. The same real-world region of the surrounding environment is captured in the overlap region 8 by the front camera 2 in image 6 and by the right camera 3 in image 7. Therefore, the respective pixel statistics of the images 6 and 7 should be the same as one another in the overlap region 8.

In step 24, the pixel statistics of a predetermined number of predetermined pixels in the overlap region 8 are measured in a given frame of the image 6 from the front camera 2 and of the image 7 of the right camera 3.

In step 26, the difference between the pixel statistics of the image 6 and the pixel statistics of the image 7 in the overlap region 8 is determined.

In step 28, a correction factor is calculated, wherein this correction factor is predicted to produce a reduction in the pixel statistic difference of less than half of the difference when the correction factor is applied to the image 6 or to the image 7.

In step 30, the correction factor is applied in a hardware device acquiring the image, for example either in the camera acquisition parameters of the respective camera for example the front camera 2, or in the video decoding device 14 for the front camera 2. Respective correction factors can also similarly be determined for and applied to the respective other cameras or the video decoding device associated therewith.

The method returns to step 22 and is reiterated or repeated in that a further frame of each respective image is received from the front camera 2 and the right camera 3. Since the correction factor has been applied in the hardware, either in the camera 2 itself or in the video decoding device 14, the next image (i.e. image frame) captured from the camera 2 is thus already directly corrected by the previously calculated and applied correction factor. The method can then be reiterated any number of times whereby the correction factor is iteratively improved or fine-tuned and adapted to changing environmental conditions such as the lighting intensity or lighting hue in the respective image areas covered by the respective cameras.

While the method illustrated by the flowchart 20 has been described with reference to the front camera 2, the right camera 3 and the overlap region 8, it should be understood that the same method can be applied for each of the further overlap regions 9, 10, 11.

An image is typically produced from or represented in three image information channels. $YC_bC_r$ is a family of color spaces used as a part of the color image pipeline in video and digital photography systems. Y represents luminance and is the luma component, and $C_b$ and $C_r$ are respectively the blue-difference and red-difference chroma components. Thus, in one embodiment, one of the channels provides luminance Y, and two of the channels provide chroma $C_r$ and $C_b$. In another embodiment, i.e. in other types of cameras, the channels can be denoted as red R, green G and blue B. These channels or types of image information are respectively given for each pixel of each frame of an image, and are the information for which the pixel statistics may be determined.

The pixel statistics may be measured and differences thereof between two cameras' images determined for only one of these image information channels forming the image, for example the luminance, or may be measured and determined for each of the three channels, for example the luminance and the two chroma channels, or the red, green and blue channels. By measuring and correcting for pixel statistic differences of only a single channel, use of processor resources may be further reduced. However, by measuring and correcting all three image information channels, a more harmonized image may be produced.

The method may be carried out by a computer program that may be part of an algorithm stored in a microelectronic chip such as a digital signal processor (DSP).

Figure 3:
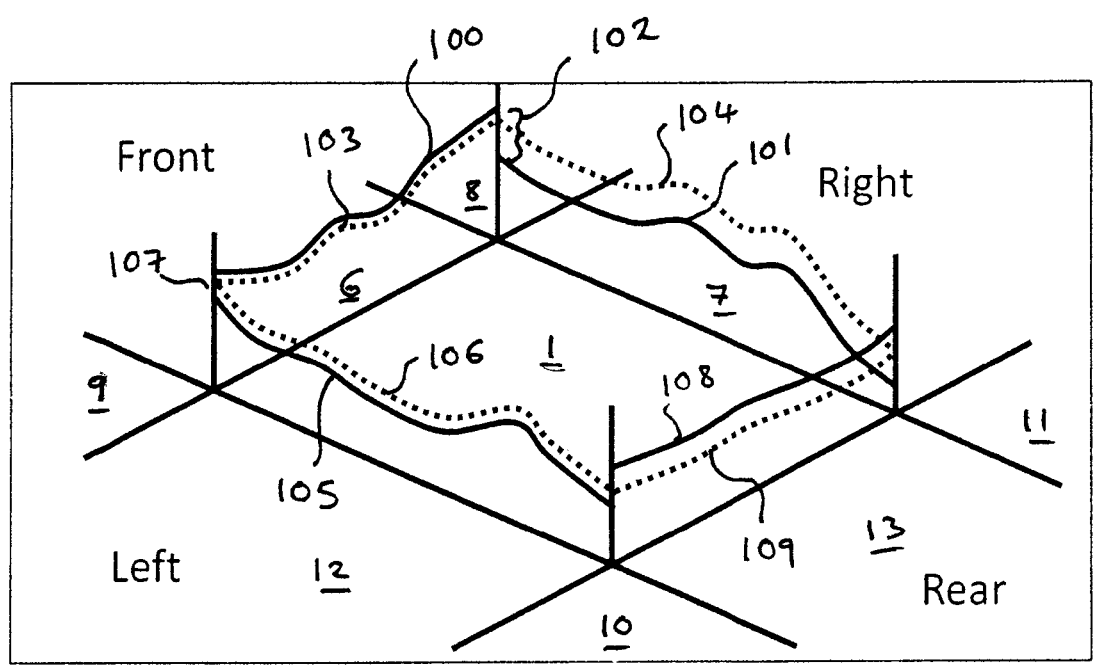
FIG. 3 is a schematic diagram illustrating the harmonization of a combined image in a 3-D perspective view.

FIG. 3 is a schematic diagram illustrating the effects of the method of the flow chart 20 for harmonizing the combined image. In FIG. 3, the vehicle 1 and the images 6, 7, 12, 13 captured by the four cameras 2, 3, 4, 5 are indicated in a perspective view by perpendicular axes of a graph in the ground plane. The vertical axis of the graph represents the pixel statistics, for example the luminance of the images. Taking the images 6, 7 and the overlap region 8 between them as an example, the effect of the method will now be described.

The image 6 has a luminance determined from the pixel statistics across the image 6 illustrated by the solid line 100. The image 7 has a luminance illustrated by the solid line 101. In the overlap region 8, it can be seen that the luminance 100 of the front image 6 is greater than the luminance 101 of the right image 7. It is, therefore, desirable to reduce (or eliminate) this difference 102 in order to harmonize the images 6, 7. This may be achieved by applying a correction factor to all of the pixels of the images 6, 7 in order that, in the case of the front image 6, the luminance is reduced to a lower luminance level as is indicated by the dotted line 103, and in the case of the right image 7, the luminance is increased to a higher luminance level as is indicated by the dotted line 104. In particular, the correction factor(s) may be calculated in order to aim to achieve the same consistent or matching luminance value in the overlap region 8, e.g. where the dotted lines 103 and 104 intersect one another. The method can be carried out for each of the overlapping regions, whereby especially the four determined correction values for the four cameras will achieve a suitable match of the corrected pixel statistics or image information channel(s) at all four overlap regions as shown in FIG. 3.

For example, in the overlapping region 9 between the front image 6 and the left image 12, the left image 12 has a luminance indicated by solid line 105 which is less than the luminance 100 of the front image 6. Therefore, a correction factor may be applied to increase the luminance of the left image 12, up to a luminance level indicated by the reference number 106, in order to reduce (or eliminate) the difference 107 between the luminance values in the overlapping region 9. Similarly, the luminance 108 of the rear image 13 is higher than the luminance 105 of the left image 12 and the luminance 101 of the right image 7 in both of the overlapping regions 10, 11. Therefore, a correction factor is applied to reduce the luminance 108 of the rear image 13, down to a luminance level as indicated by the dotted line 109, so that it approaches (or matches) the corrected luminance 106 of the corrected left image, and the corrected luminance 104 of the corrected right image.

The steps described in flowchart 20 of FIG. 2 may also comprise one or more of the following features.

In step 24, the overlap regions and the list of pixels to sample can be precalculated or otherwise predetermined and previously stored in a lookup table or other data storage structure. In order to determine the pixels within the overlap regions, the following method may be used. The setup information, including video widget sizes, camera intrinsics and extrinsics are gathered. The overlap areas of the video widgets in screen coordinates are determined and the overlap areas are converted into real-world coordinates on the ground plane. A grid is created to sample each overlap area uniformly and the real world grid is mapped into camera pixel coordinates, taking account of the camera intrinsics, for example fisheye lens distortion. The list of selected or all pixel positions within the overlap regions is then stored in the lookup table.

In step 26, in the analysis of the images, the mean of all of the pixels specified in the lookup table is calculated. For example, 24 means or averages are calculated, because there are four overlap regions multiplied by two images per overlap region multiplied by three color channels, which in this embodiment are $YC_bC_r$.

A method may include obtaining a pointer to the input camera buffer, indexing the buffer by pixel location in the lookup table, summing the three color channels separately for each region and image, dividing each sum by the number of entries in the lookup table and storing each mean in a class member variable.

In step 28, a uniform one point correction may be used to adjust the pixels by the same amount e.g. as an offset or as a gain, for example by adding or multiplying by a constant. This embodiment may be used if only the luminance of the image is measured and corrected. The variance may be calculated if a two point gain and offset correction is required.

In step 28, in an example embodiment, the correction factor is calculated based on the means or averages that were calculated in the overlap regions. For the luminance channel, the gain correction is calculated. Adjusting the gain means that completely dark pixels stay dark. The changing brightness is proportional to the pixel value. For the chrominance channels, an offset correction is used, because a gain adjustment would change the saturation rather than the hue.

The process of calculating the adjustment is as follows in an example embodiment. The difference between corresponding images/channels within a single overlap region is calculated. This results in 12 differences arising from four overlap regions for each of three channels. The mean of the differences for each image and color channel is calculated. The correction is then determined as at most half this difference, because two overlapping images should converge. The mean of all the measured mean luminance values is calculated and a global correction is calculated as the difference between the measured values and the target mean luminance value. The global correction is added to luminance channel correction and the correction values are stored in the class member variables.

The three channels are processed separately, but the luminance channel has an extra process in a further embodiment to adjust the overall brightness of the output image which is based on trying to achieve a target value. The target mean value is initially set to be a value of 128 and, therefore, mid-gray, and the luminance corrections are calculated so that the global mean converges on this value. However, in certain circumstances, a value of 128 is unachievable, usually when limit of ±30% offset is reached. If there is one very dark image, as soon as the adjustment to this channel reaches its maximum, no further global gain can be added, because the offsets are calculated relative to each other. The solution is to reduce the target mean to an achievable value. This may be done using a control loop that dynamically analyzes the current adjustment levels and if they are likely to saturate, the target value is adjusted accordingly.

In step 30, the image correction is preferably applied entirely in hardware, for example in the video decoder. This may be achieved by writing to registers. In the case that there is an automatic gain control, the automatic gain control mode should be set to manual adjustment to allow the correction to be added.

If luminance only is measured and corrected, then one iteration of the method may be carried out in 1.15 ms, for example. In the case that chrominance is also compensated, the time taken to carry out one iteration of the method is slower at 2.38 ms for example.

Figure 4:
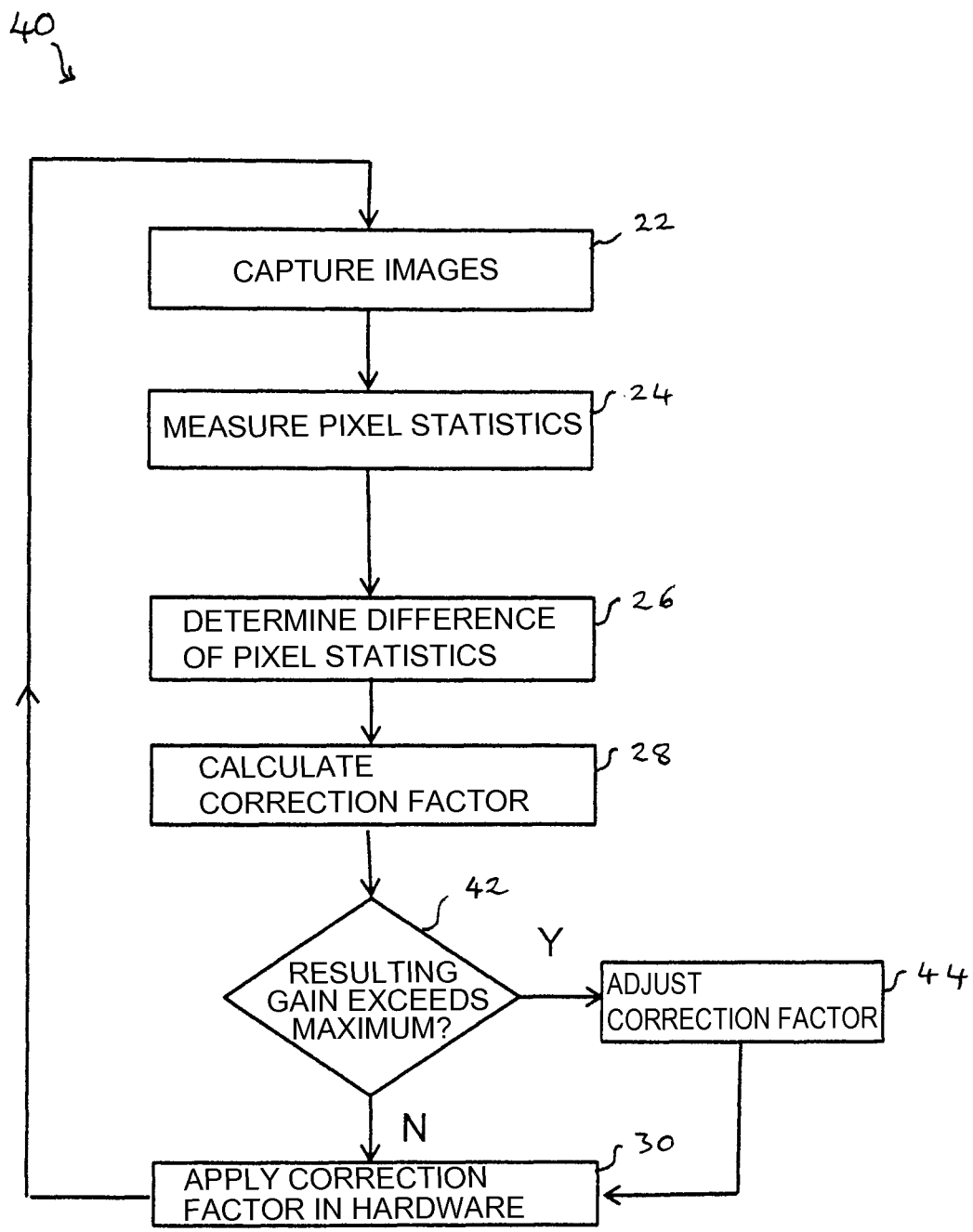
FIG. 4 is a flowchart illustrating a method for harmonizing a combined image according to a second embodiment.

FIG. 4 illustrates a flow chart 40 representing a method for harmonizing an image according to a second embodiment. In the flow chart 40, the steps 22, 24, 26 and 28 of the flowchart 20 illustrated in FIG. 2 are carried out similarly as described above and are not explained again.

After the correction factor has been calculated in step 28, in decision diamond 42, it is determined whether the correction factor is predicted to result in a gain value for the hardware device which is higher than a predetermined maximum gain value. In the case that the correction factor is predicted to result in gain value for the hardware device which is higher than a predetermined maximum gain value, the step 44 is performed in which the correction factor is adjusted so that the predicted gain value for the hardware device is less than or equal to the predetermined maximum gain value. This adjusted correction factor is applied in the hardware device in step 30.

If, in decision diamond 42, the correction factor is not predicted to result in gain value for the hardware device which is higher than a predetermined maximum gain value, the method continues with step 30. In step 30, the correction factor is applied in the hardware device as described in connection with the flowchart 20 in FIG. 2.

After step 30, the method returns to step 22 and is reiterated or repeated with a further image (i.e. image frame) that is received respectively from the two cameras in step 22.

Figure 5:
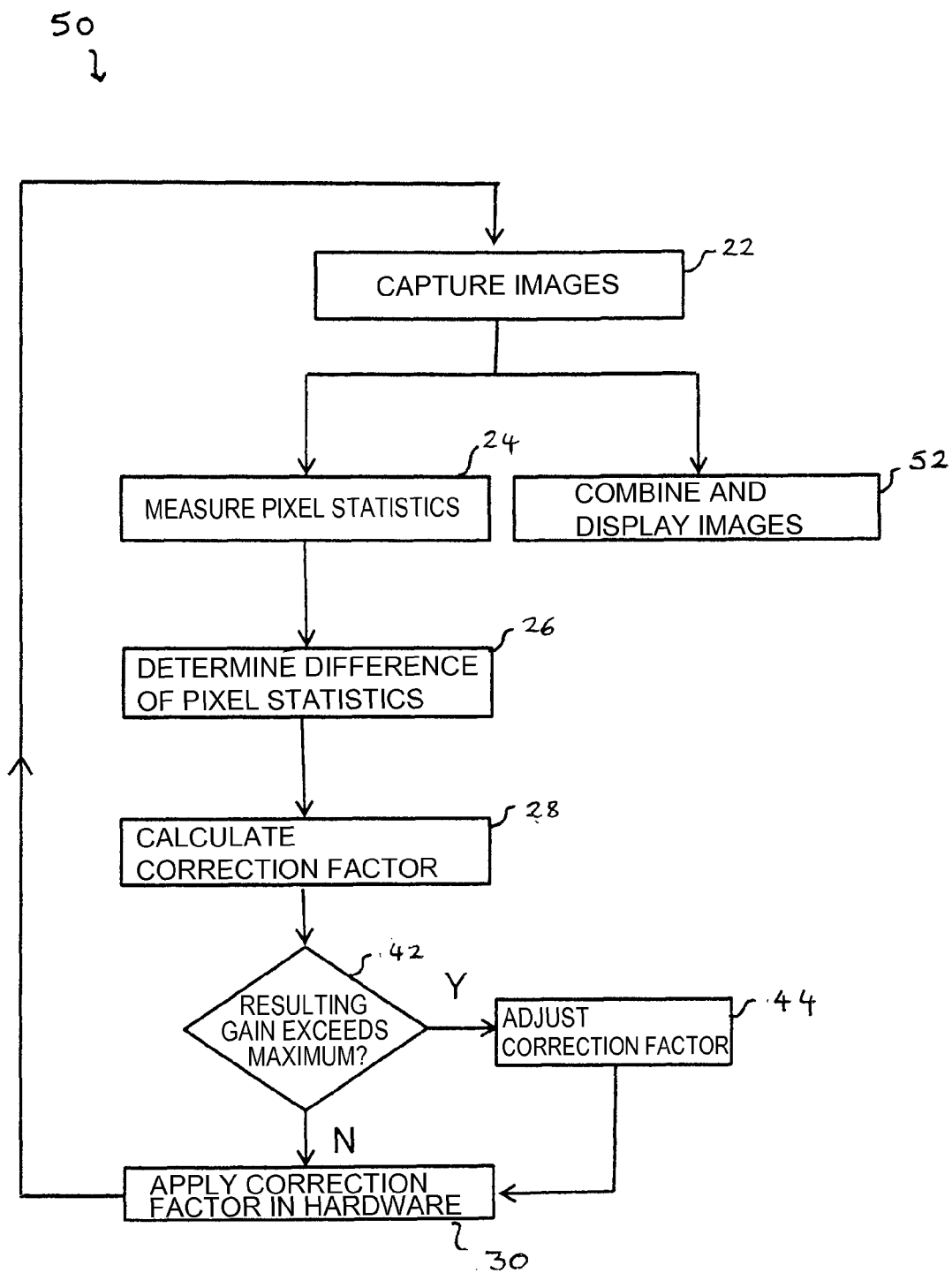
FIG. 5 is a flowchart illustrating a method for harmonizing a combined image according to a third embodiment.

FIG. 5 is a flowchart 50 representing a method for harmonizing an image according to a third embodiment. In the flowchart 50, two steps are performed after an image is received from each of the two or more cameras in step 22. In the first branch, the steps 24, 26, 28, 42, optionally step 44, and step 30 are carried out as in the method illustrated by flowchart 40 in FIG. 4 and are not described again here.

In the second branch, after step 22, the images from two or more cameras are combined and displayed in step 52. Since the correction factor is applied in the hardware, the images received in step 22 have already had the correction factor from the previous iteration of the method applied to all of the pixels. Therefore, by reiterating the method illustrated by the flowchart 50, the combined image produced in step 52 may be increasingly harmonized in successive frames thereof, and differences in the luminance and, optionally color, in the images received from the different cameras are reduced.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A method for harmonizing a combined image, comprising:
    receiving an image respectively from each of two or more cameras of an image-acquiring hardware device, the images from two of the cameras representing the same region in a first overlap region;
    measuring first pixel statistics of a predetermined number of predetermined pixels only in the first overlap region respectively for the respective image of each of the two cameras;
    determining a difference $\Delta_{pixel}$ in the first pixel statistics of the respective images from the two cameras only in the first overlap region;
    calculating a first correction factor $K_{pixel}$ based on the difference $\Delta_{pixel}$, wherein the first correction factor $K_{pixel}$ is determined so that it would produce a reduction in the difference $\Delta_{pixel}$ of less than $\Delta_{pixel}/2$ when applied to the image of one of the two cameras;
    applying the first correction factor $K_{pixel}$ in the image-acquiring hardware device; and
    receiving a further image respectively from each of the two cameras.

2. The method according to claim 1, wherein the measuring of the pixel statistics comprises measuring the pixel statistics of one or more channels forming the image.

3. The method according to claim 1, wherein the measuring of the pixel statistics comprises determining the luminance of the pixels in the overlap region of the image from each of the two cameras and calculating a mean of the luminance in the overlap region of the image from each of the two cameras.

4. The method according to claim 3, further comprising determining a variance of the luminance of the pixels in the overlap region of the image from each of the two cameras.

5. The method according to claim 1, wherein the measuring of the pixel statistics comprises measuring the luminance and the chroma of the pixels in the overlap region of the image from each of the two cameras and calculating a mean of the luminance and a mean of the chroma in the overlap region of the image from each of the two cameras.

6. The method according to claim 1, further comprising determining whether the correction factor $K_{pixel}$ is predicted to result in a gain value for the hardware device which is higher than a predetermined maximum gain value, and if so then adjusting the correction factor $K_{pixel}$ so that the predicted gain value for the hardware device is less than or equal to the predetermined maximum gain value.

7. The method according to claim 1, wherein the correction factor $K_{pixel}$ is applied to all of the pixels of the further image acquired by at least one of the cameras.

8. The method according to claim 1, wherein the hardware device further includes a video decoding device, and the correction factor is applied in the video decoding device.

9. The method according to claim 8, wherein the correction factor $K_{pixel}$ is applied to at least one of gain values and offset values of the video decoding device.

10. The method according to claim 1, wherein the correction factor is applied in at least one of the cameras.

11. The method according to claim 10, wherein the correction factor $K_{pixel}$ is applied to image acquisition parameters of the camera.

12. The method according to claim 1, further comprising combining with one another a respective image from each of the at least two cameras to form a combined image, and displaying the combined image.

13. A computer program product, comprising a non-transitory computer-readable medium having program code stored thereon, that when executed on a processor, causes the processor to perform the method according to claim 1.

14. A system for performing the method according to claim 12 and displaying a harmonized combined image, said system comprising at least two cameras, a display unit and a device comprising a processor and a module configured and arranged to receive respective images from the cameras, wherein the module comprises a non-transitory computer-readable medium having program code stored thereon, that when executed on the processor, causes the processor to perform said method to display the combined image on the display unit.

15. A method of combining and harmonizing plural images, comprising the steps:
    a) in an image acquisition hardware device including an electronic first image sensor and an electronic second image sensor, using said first image sensor acquiring a frame of a first image of a first area of an environment, and using said second image sensor acquiring a frame of a second image of a second area of said environment, wherein said first and second images overlap one another in a first overlap region at which said first and second areas overlap one another;

b) measuring first pixel statistics of at least some pixels of said frame of said first image only in said first overlap region, and measuring second pixel statistics of at least some pixels of said frame of said second image only in said first overlap region;

c) determining a first difference between said first pixel statistics and said second pixel statistics relating to only said first overlap region;

d) determining a first correction factor that, when applied to said first pixel statistics or to said second pixel statistics, would reduce said first difference;

e) applying said first correction factor in said image acquisition hardware device so that said first correction factor will apply to a further frame of said first image acquired using said first image sensor or to a further frame of said second image acquired using said second image sensor; and f) iteratively repeating said steps a) to e) with successive further frames of said first image acquired using said first image sensor and successive further frames of said second image acquired using said second image sensor.

16. The method according to claim 15, wherein said first correction factor is determined so that, when applied to said first pixel statistics or to said second pixel statistics, said first correction factor would reduce said first difference by less than one-half of said first difference.

17. The method according to claim 15, wherein said first correction factor is a multiplicative gain factor.

18. The method according to claim 15, further comprising combining said first image and said second image to form thereof a combined image, and displaying said combined image on a display device.

19. The method according to claim 15, wherein said step e) comprises applying said first correction factor directly in said first image sensor or in said second image sensor, to image acquisition parameters thereof.

20. The method according to claim 15, wherein said image acquisition hardware device further includes an electronic third image sensor, and said method further comprises the steps:

g) using said third image sensor, acquiring a frame of a third image of a third area of said environment, wherein said second and third images overlap one another in a second overlap region at which said second and third areas overlap one another;

h) measuring third pixel statistics of at least some pixels of said frame of said second image only in said second overlap region, and measuring fourth pixel statistics of at least some of said pixels of said frame of said third image only in said second overlap region;

i) determining a second difference between said third pixel statistics and said fourth pixel statistics relating to only said second overlap region;

j) determining a second correction factor that, when applied to said third pixel statistics or to said fourth pixel statistics, would reduce said second difference, and further determining said first and second correction factors so that, when said first correction factor would be applied to said frame of said first image or said second image, and said second correction factor would be applied to said frame of said second image or said third image, thereby both said first difference and said second difference would respectively be reduced;

k) applying said second correction factor in said image acquisition hardware device so that said second correction factor will apply to a further frame of said second image acquired using said second image sensor or to a further frame of said third image acquired using said third image sensor; and l) iteratively repeating said steps g) to k) with said successive further frames of said second image acquired using said second image sensor and successive further frames of said third image acquired using said third image sensor.

* * * * *